United States Patent
Huang et al.

(10) Patent No.: US 10,739,318 B2
(45) Date of Patent: Aug. 11, 2020

(54) DETECTION SYSTEM INCLUDING SENSORS AND METHOD OF OPERATING SUCH

(71) Applicant: General Electric Company, Schenectady, NY (US)

(72) Inventors: Dayu Huang, Rexford, NY (US); Emad Andarawis Andarawis, Ballston Lake, NY (US); Edward James Nieters, Burnt Hills, NY (US); Cheng-Po Chen, Niskayuna, NY (US); Marco Guerriero, Niskayuna, NY (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 358 days.

(21) Appl. No.: 15/491,083

(22) Filed: Apr. 19, 2017

(65) Prior Publication Data
US 2018/0306750 A1 Oct. 25, 2018

(51) Int. Cl.
*G01N 29/44* (2006.01)
*E21B 33/06* (2006.01)
(Continued)

(52) U.S. Cl.
CPC ......... *G01N 29/4418* (2013.01); *E21B 33/06* (2013.01); *E21B 47/091* (2013.01);
(Continued)

(58) Field of Classification Search
CPC ........ E21B 33/06; E21B 47/091; E21B 47/14; G01N 2291/106; G01N 2291/2634; G01N 29/3318; G01N 29/4418
See application file for complete search history.

(56) References Cited

U.S. PATENT DOCUMENTS 2,340,609 A * 2/1944 Mestas .................. E21B 43/12
315/392
3,103,976 A 9/1963 De Vries et al.
(Continued)

FOREIGN PATENT DOCUMENTS

CA 2536451 A1 8/2007
WO 2011/115948 A1 9/2011

OTHER PUBLICATIONS

International Search Report and Written Opinion issued in connection with corresponding PCT Application No. PCT/US2018/14249 dated May 28, 2018.
(Continued)

*Primary Examiner* — John Fitzgerald
(74) *Attorney, Agent, or Firm* — Armstrong Teadale LLP

(57) ABSTRACT

A detection system includes a first sensor configured to send a first ultrasonic pulse toward an object in a blowout prevention system. The first ultrasonic pulse has a first parameter. The detection system also includes a second sensor spaced from the first sensor and configured to send a second ultrasonic pulse toward the object. The second ultrasonic pulse has a second parameter that is different from the first parameter of the first ultrasonic pulse. The first parameter and the second parameter are one of an amplitude, a frequency, a duration, an emission time, and an excitation code. The second sensor is further configured to receive the first ultrasonic pulse after the first ultrasonic pulse interacts with the object. The detection system is configured to determine that the first ultrasonic pulse received by the second sensor was sent by the first sensor. The detection system further includes a controller coupled to the second sensor and configured to determine a characteristic of the object based on the first ultrasonic pulse.

19 Claims, 2 Drawing Sheets

(51) Int. Cl.
*E21B 47/14* (2006.01)
*E21B 47/09* (2012.01)
*G01N 29/11* (2006.01)

(52) U.S. Cl.
CPC .............. *E21B 47/14* (2013.01); *G01N 29/11* (2013.01); *G01N 29/4472* (2013.01); *G01N 2291/015* (2013.01); *G01N 2291/044* (2013.01); *G01N 2291/106* (2013.01); *G01N 2291/2634* (2013.01)

(56) References Cited

U.S. PATENT DOCUMENTS

| | | | | |
|---|---|---|---|---|
| 3,930,404 | A * | 1/1976 | Ryden, Jr. | G01B 17/02 73/622 |
| 4,172,250 | A * | 10/1979 | Guignard | G01V 1/44 367/27 |
| 4,704,708 | A * | 11/1987 | Dennis | G10K 11/02 367/25 |
| 4,951,508 | A * | 8/1990 | Loper, Jr. | G01C 19/5691 73/1.84 |
| 5,156,636 | A * | 10/1992 | Kuljis | G01B 17/02 73/597 |
| 5,419,331 | A * | 5/1995 | Parker | G01S 15/582 600/407 |
| 5,701,179 | A * | 12/1997 | Chatterjee | G01B 11/24 356/605 |
| 5,740,124 | A * | 4/1998 | Chunduru | G01V 1/46 367/25 |
| 5,750,896 | A * | 5/1998 | Morgan | B23Q 17/09 73/622 |
| 5,761,155 | A * | 6/1998 | Eccardt | G01B 17/00 367/87 |
| 5,978,739 | A | 11/1999 | Stockton | |
| 6,478,087 | B2 * | 11/2002 | Allen | E21B 47/0001 166/250.01 |
| 6,815,945 | B2 * | 11/2004 | Biester | E21B 47/0905 324/207.24 |
| 7,558,675 | B2 * | 7/2009 | Sugiura | G01V 11/00 702/6 |
| 8,117,907 | B2 * | 2/2012 | Han | E21B 47/082 73/152.58 |
| 9,416,649 | B2 | 8/2016 | Andarawis et al. | |
| 9,598,953 | B2 * | 3/2017 | Ringgenerg | E21B 34/045 |
| 9,605,532 | B2 * | 3/2017 | Cayeux | E21B 47/09 |
| 10,087,745 | B2 * | 10/2018 | Gottlieb | E21B 47/091 |
| 10,233,739 | B2 * | 3/2019 | Xue | E21B 47/00 |
| 2001/0006511 | A1 * | 7/2001 | Matt | H04B 3/23 370/286 |
| 2002/0121369 | A1 * | 9/2002 | Allen | E21B 47/0001 166/242.1 |
| 2003/0172738 | A1 * | 9/2003 | Poizat | G01N 29/14 73/660 |
| 2004/0095847 | A1 * | 5/2004 | Hassan | E21B 47/101 367/25 |
| 2005/0055163 | A1 | 3/2005 | Hopper | |
| 2005/0259512 | A1 * | 11/2005 | Mandal | E21B 47/082 367/10 |
| 2005/0283315 | A1 * | 12/2005 | Haugland | E21B 47/082 702/6 |
| 2006/0015307 | A1 * | 1/2006 | Holschneider | G06F 17/18 703/2 |
| 2006/0065401 | A1 | 3/2006 | Allen et al. | |
| 2007/0219757 | A1 | 9/2007 | Papadimitriou et al. | |
| 2008/0186805 | A1 * | 8/2008 | Han | E21B 47/01 367/35 |
| 2009/0030616 | A1 * | 1/2009 | Sugiura | G01V 11/00 702/9 |
| 2009/0132181 | A1 | 5/2009 | Girndt | |
| 2010/0154531 | A1 * | 6/2010 | Han | E21B 47/082 73/152.47 |
| 2010/0315905 | A1 * | 12/2010 | Lee | G01S 5/28 367/127 |
| 2011/0144935 | A1 * | 6/2011 | McKeon | G01N 29/043 702/66 |
| 2011/0161065 | A1 * | 6/2011 | Volker | G01N 29/041 703/14 |
| 2012/0191377 | A1 * | 7/2012 | Engl | G01N 29/069 702/39 |
| 2013/0268214 | A1 * | 10/2013 | Guan | G01N 29/4472 702/34 |
| 2013/0286783 | A1 | 10/2013 | Sussman et al. | |
| 2014/0060196 | A1 * | 3/2014 | Falter | G01N 29/262 73/632 |
| 2014/0305219 | A1 * | 10/2014 | Falter | G01N 29/343 73/628 |
| 2015/0204182 | A1 | 7/2015 | Andarawis et al. | |
| 2015/0226049 | A1 * | 8/2015 | Frangos | E21B 44/00 702/6 |
| 2015/0308253 | A1 | 10/2015 | Clark et al. | |
| 2016/0145991 | A1 * | 5/2016 | Yarus | E21B 44/00 700/275 |
| 2016/0170063 | A1 * | 6/2016 | Leggett | G01V 1/44 367/7 |
| 2016/0195401 | A1 * | 7/2016 | Lu | G01S 5/0278 702/152 |
| 2016/0222741 | A1 * | 8/2016 | Lovorn | E21B 47/06 |
| 2016/0312603 | A1 | 10/2016 | Gottlieb et al. | |
| 2017/0074067 | A1 | 3/2017 | Jaffrey et al. | |
| 2017/0086799 | A1 * | 3/2017 | Kameishi | A61B 8/54 |
| 2018/0119692 | A1 * | 5/2018 | Bangor | G01H 1/00 |
| 2018/0172546 | A1 * | 6/2018 | Calzavara | G01M 3/243 |
| 2018/0306026 | A1 * | 10/2018 | Nieters | E21B 47/091 |

OTHER PUBLICATIONS

Shengli et al., "Research on Casing Wear Monitoring Technique Based on Detection of Tool Joints and its Field Test", International Conference on Electronic and Mechanical Engineering and Information Technology (EMEIT), dated Aug. 12-14, 2011, XX pps.

"Instrumentation and Data", Stress Engineering Services, dated 2017, XX pps.

Gullik A. Jensen, "Riser and Wellhead Monitoring for Improved Offshore Drilling Operations", CeSOS Highlights and AMOS Visions Conference, dated May 27, 2013, XX pps.

\* cited by examiner

DETECTION SYSTEM INCLUDING SENSORS AND METHOD OF OPERATING SUCH

STATEMENT REGARDING FEDERALLY SPONSORED RESEARCH AND DEVELOPMENT

This invention was made with Government support under contract number 11121-5503-01 awarded by the Research Partnership to Secure Energy for America (RPSEA). The Government has certain rights in this invention.

BACKGROUND

The field of the disclosure relates generally to detection systems, and more particularly to a system including a plurality of sensors for detecting objects.

Many known detection systems include sensors that are configured to detect an object. For example, at least some known detection systems are configured to detect a pipe that extends through a wellbore. In at least some known detection systems, a first sensor sends a first pulse toward the pipe and receives the first pulse after the first pulse is reflected by the pipe. Subsequently, a second sensor sends a second pulse toward the pipe and receives the second pulse after the second pulse is reflected by the pipe. The data gathered from the sequential pulsing of the sensors is used to determine a position of the pipe. However, conditions in the wellbore change during the sequential pulsing of the sensors. For example, sometimes the position of the pipe changes during the sequential pulsing. Moreover, each sensor only detects objects that are at least a minimum distance from the sensor because the self-resonance, i.e., ringing, of the sensor obfuscates the pulse reflected by objects within the minimum distance.

Therefore, it is desirable to provide a detection system including a plurality of sensors that more accurately and reliably detects objects.

BRIEF DESCRIPTION

In one aspect, a detection system is provided. The detection system includes a first sensor configured to send a first ultrasonic pulse toward an object in a blowout prevention system. The first ultrasonic pulse has a first parameter. The detection system also includes a second sensor spaced from the first sensor and configured to send a second ultrasonic pulse toward the object. The second ultrasonic pulse has a second parameter that is different from the first parameter of the first ultrasonic pulse. The first parameter and the second parameter are one of an amplitude, a frequency, a duration, an emission time, and an excitation code. The second sensor is further configured to receive the first ultrasonic pulse after the first ultrasonic pulse interacts with the object. The detection system is configured to determine that the first ultrasonic pulse received by the second sensor was sent by the first sensor. The detection system further includes a controller coupled to the second sensor and configured to determine a characteristic of the object based on the first ultrasonic pulse.

In another aspect, a method of detecting an object in a blowout prevention system is provided. The method includes sending, using a first sensor, an ultrasonic pulse toward an object. The method also includes receiving, using a second sensor, the ultrasonic pulse after the ultrasonic pulse interacts with the object. The second sensor is spaced from the first sensor. The method further includes determining that the ultrasonic pulse received by the second sensor was sent by the first sensor. The method also includes determining, using a controller coupled to the second sensor, a characteristic of the object based on the ultrasonic pulse.

In still another aspect, a production system is provided. The production system includes a pipe extending through a wellbore and a blowout preventer configured to receive the pipe. The production system also includes a detection system configured to detect the pipe. The detection system includes a first sensor configured to send an ultrasonic pulse toward the pipe. The detection system also includes a second sensor spaced from the first sensor. The second sensor is configured to receive the ultrasonic pulse after the ultrasonic pulse interacts with the pipe. The detection system is configured to determine that the first ultrasonic pulse received by the second sensor was sent by the first sensor. The detection system further includes a controller coupled to the second sensor and configured to determine a characteristic of the pipe based on the ultrasonic pulse.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
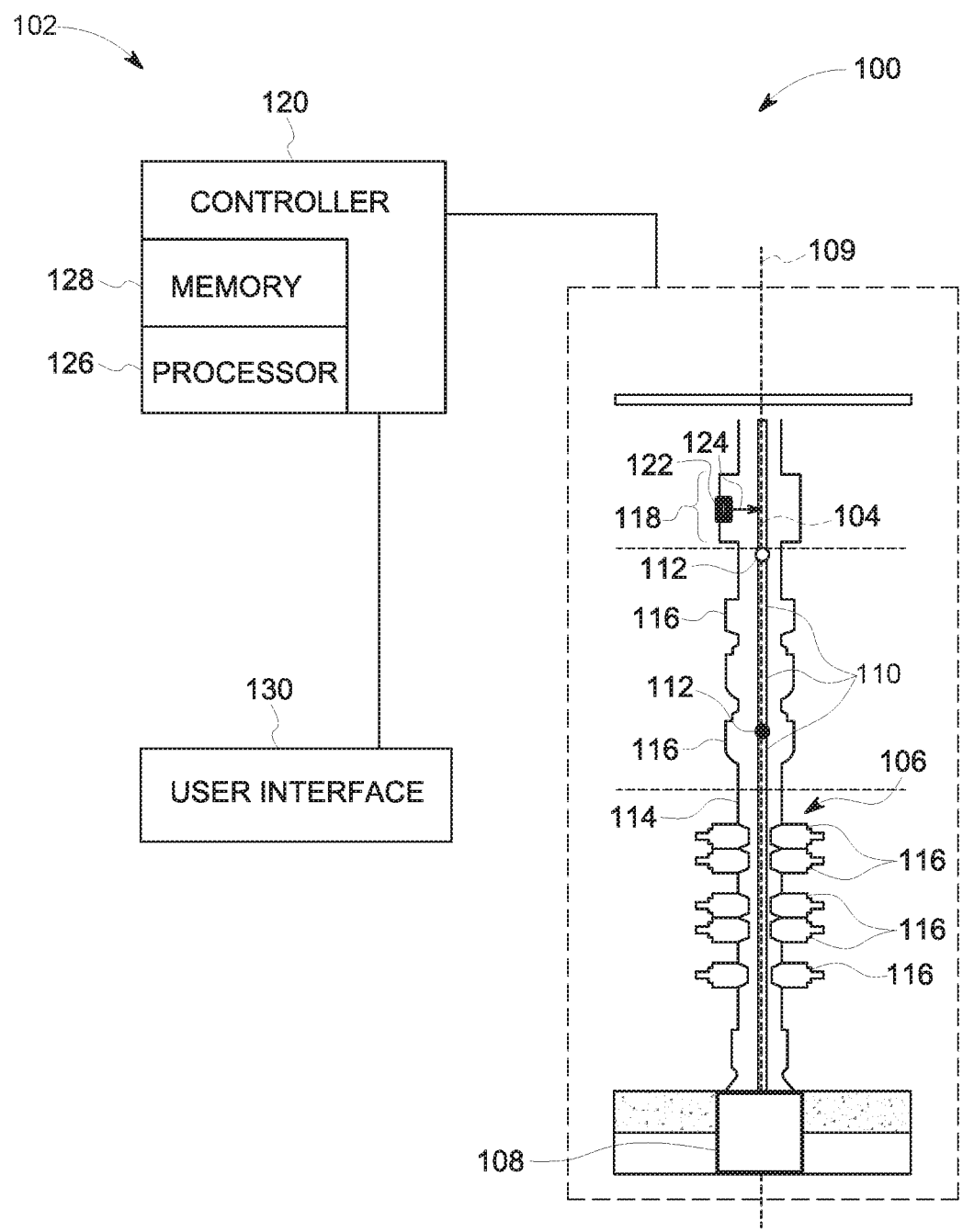
FIG. 1 is a schematic view of an exemplary production system including a detection system.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As used herein, the term "excitation code" refers to a representation of a pattern or sequence of pulses produced by a transducer.

The methods and systems described herein provide reliable detection of an object in difficult to access locations. For example, embodiments of a detection system include a plurality of sensors that send pulses towards an object. At least one sensor of the plurality of sensors is configured to receive a pulse sent by a different sensor and the detection system is configured to determine the source of the pulse. In addition, in some embodiments, the sensors are configured to emit pulses at the same time. As a result, the detection system more reliably determines characteristics of the object in comparison to systems where each sensor sends and receives the same ultrasonic pulse and sensors only emit pulses in a sequential order. Moreover, in some embodiments, parameters of the ultrasonic pulses are varied to facilitate detection of the object. For example, in some embodiments, the parameters are varied based on an estimated characteristic of the object.

FIG. 1 is a schematic view of an exemplary production system 100 including a detection system 102. Production system 100 includes detection system 102, a pipe 104, and a BOP system 106. Pipe 104 extends through a wellbore 108 along a longitudinal axis 109 of wellbore 108 during operation of production system 100. For example, during a drilling phase, production system 100 is configured to transport fluid through pipe 104 to wellbore 108. In the exemplary embodiment, pipe 104 includes a plurality of sections 110 coupled together by pipe joints 112. In alternative embodiments, production system 100 has any configuration that enables production system 100 to operate as described herein.

In the exemplary embodiment, BOP system 106 includes a stack 114 and a plurality of blowout preventers 116 configured to seal wellbore 108. For example, blowout preventers 116 include, without limitation, an annular preventer, a blind shear ram, a casing shear ram, a pipe ram, and/or any other suitable blowout preventer. As pipe 104 moves through BOP system 106, detection system 102 determines characteristics of pipe 104, such as a size and location of pipe 104. In alternative embodiments, production system 100 includes any BOP system 106 that enables production system 100 to operate as described herein.

Also, in the exemplary embodiment, detection system 102 includes a plurality of sensors 118 and a controller 120. Sensors 118 are coupled to BOP system 106 (shown in FIG. 1) and spaced about pipe 104. In some embodiments, each sensor 118 includes a transducer 122. Transducers 122 vibrate at an ultrasonic frequency and generate ultrasonic pulses 124. Each ultrasonic pulse 124 has a frequency, an amplitude, and a wavelength controlled by the vibration of transducer 122. Sensors 118 are configured to send ultrasonic pulses 124 at a predetermined emission time for a predetermined duration of time. In some embodiments, parameters of ultrasonic pulse 124 such as frequency, amplitude, wavelength, emission time, duration and excitation code are varied to facilitate detection system 102 distinguishing individual ultrasonic pulses 124. For example, in some embodiments, at least one sensor 118 uses an excitation code including a sequence of ultrasonic pulses 124 that is different from an excitation code of at least one other sensor 118. In alternative embodiments, detection system 102 includes any sensor 118 that enables detection system 102 to operate as described herein.

In addition, in the exemplary embodiment, controller 120 is communicatively coupled to sensors 118 and configured to receive signals from sensors 118. Controller 120 includes a processor 126 and a memory 128. Processor 126 is configured to determine a characteristic of production system 100 based on signals from sensors 118. Memory 128 is coupled to processor 126 and is configured to store information such as determined characteristics and operational parameters. In some embodiments, processor 126 is configured to retrieve and store information on memory 128. In alternative embodiments, detection system 102 includes any controller 120 that enables detection system 102 to operate as described herein.

Moreover, in the exemplary embodiment, controller 120 determines a characteristic of pipe 104 based at least in part on information received from sensors 118. For example, in some embodiments, controller 120 is configured to determine at least one of a size and a location of pipe 104 in BOP system 106 based on the information from sensors 118. In addition, in some embodiments, controller 120 makes determinations based on operational parameters including a time that sensor 118 detects pipe joint 112 (i.e., a detection time), an operational setting of production system 100, a rate of penetration, a location of a component of BOP system 106, a design characteristic of production system 100, and a size of pipe joint 112. In some embodiments, signals and operational parameters are received by controller 120 from sensors and/or other components of production system 100. In further embodiments, operational parameters are provided by a user. In some embodiments, controller 120 determines the operational parameters from sensor readings and/or user inputs. In alternative embodiments, controller 120 utilizes any information that enables detection system 102 to operate as described herein.

In addition, in the exemplary embodiment, production system 100 includes a user interface 130. User interface 130 is configured to provide data to a user and/or receive user inputs. For example, in some embodiments, user interface 130 includes a display which provides data in a readable format for the user. In further embodiments, user interface 130 includes a keyboard and/or other input device. In alternative embodiments, production system 100 includes any user interface 130 that enables production system 100 to operate as described herein. In some embodiments, user interface 130 is omitted and production system 100 is at least partially automated.

Figure 2:
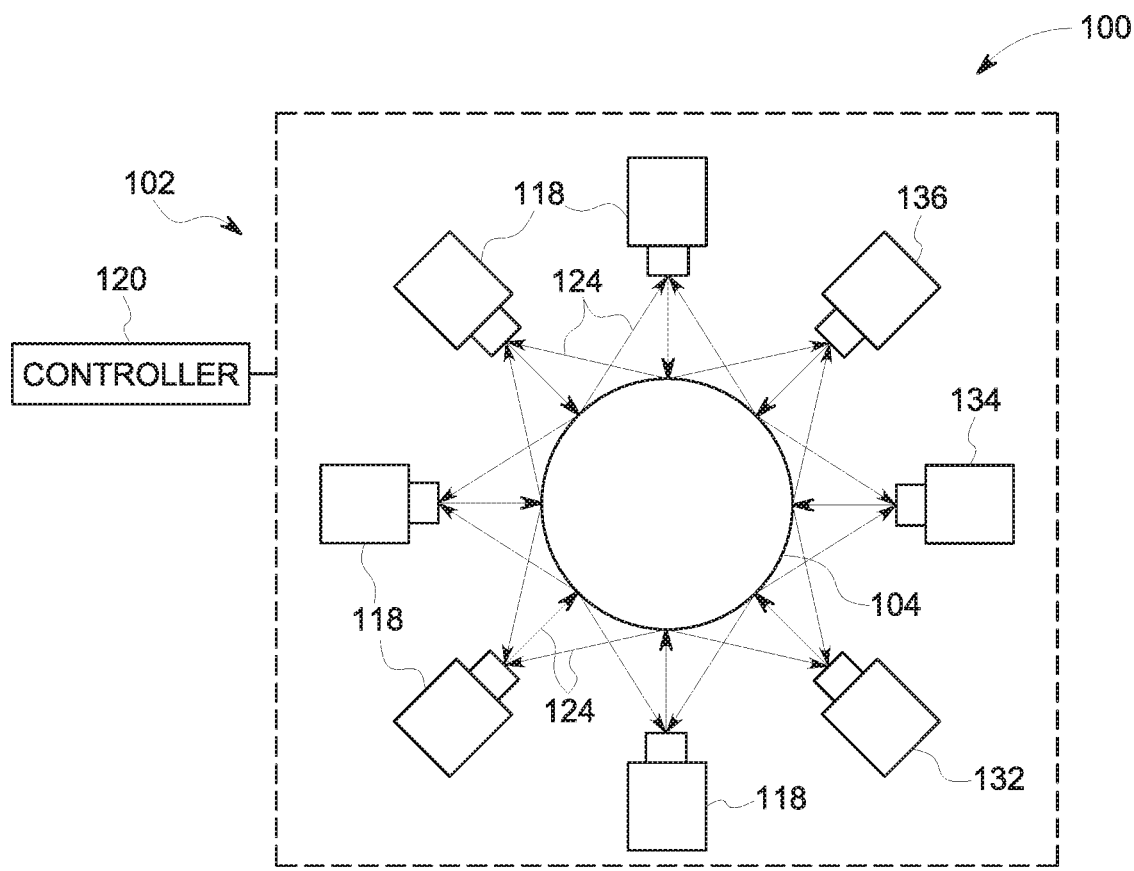
FIG. 2 is a schematic plan view of a plurality of sensors of the production system shown in FIG. 1.

FIG. 2 is a schematic view of a plurality of sensors 118 of production system 100. In the exemplary embodiment, sensors 118 are spaced about pipe 104. Each sensor 118 is configured to send ultrasonic pulses 124 toward pipe 104 and receive ultrasonic pulses 124 redirected by pipe 104. Moreover, each sensor 118 is configured to receive ultrasonic pulses 124 sent by other sensors 118 positioned about pipe 104. As a result, sensors 118 are able to detect objects in an increased range of locations and self-resonance or ringing of sensor 118 does not obfuscate reflected ultrasonic pulses 124. In alternative embodiments, sensors 118 are configured to send ultrasonic pulses 124 toward any object that enables production system 100 to operate as described herein. For example, in some embodiments, sensors 118 send ultrasonic pulses 124 towards a cable, a pipe, a tool, and/or any other component of production system 100.

In some embodiments, detection system 102 includes a plurality of sensors 118 spaced at equal angular intervals. In the exemplary embodiment, detection system 102 includes eight sensors 118 positioned about pipe 104. In alternative embodiments, detection system 102 includes any number of sensors 118 positioned in any manner that enables production system 100 to operate as described herein.

In the exemplary embodiment, sensors 118 are configured to vary parameters of ultrasonic pulses 124, such as the excitation code, the amplitude, the frequency, the pulse duration, and the emission time, to reduce cross-correlation between ultrasonic pulses 124 and facilitate detection system 102 processing ultrasonic pulses 124. For example, in some embodiments, sensors 118 emit ultrasonic pulses 124 at different times such that redirected ultrasonic pulses 124 are received at different times. Accordingly, detection system 102 is able to process a plurality of ultrasonic pulses 124 received by each sensor 118 and identify individual ultrasonic pulses 124. For example, in some embodiments, detection system 102 processes ultrasonic pulses 124 using a plurality of filters configured to match parameters of ultrasonic pulses 124. The filters allow detection system 102 to separate a set of received ultrasonic pulses 124 into individual ultrasonic pulses 124. In some embodiments, detection system 102 separates ultrasonic pulses 124 based on parameters including, for example and without limitation, a frequency, an amplitude, a pulse duration, an emission time, a received time, and an excitation code. In alternative embodiments, ultrasonic pulses 124 are processed in any manner that enables detection system 102 to operate as described herein.

In addition, in the exemplary embodiment, detection system 102 is configured to determine a source of each ultrasonic pulse 124 received by sensors 118. For example, a first sensor 132 sends first ultrasonic pulse 124 towards pipe 104 and pipe 104 redirects first ultrasonic pulse 124 towards a second sensor 134. Second sensor 134 receives first ultrasonic pulse 124 and detection system 102 interprets first ultrasonic pulse 124 received by second sensor 134. In particular, detection system 102 determines that first sensor 132 sent first ultrasonic pulse 124 received by second sensor 134. In addition, in some embodiments, first sensor 132, second sensor 134, and/or a third sensor 136 receives a second ultrasonic pulse 124 sent by second sensor 134 and detection system 102 determines that second ultrasonic pulse 124 was sent by second sensor 134. In some embodiments, detection system 102 determines the source of ultrasonic pulses 124 based on at least one of an amplitude, a frequency, a duration, an emission time, and an excitation code of ultrasonic pulse 124. In alternative embodiments, detection system 102 determines the sources of ultrasonic pulses 124 in any manner that enables production system 100 to operate as described herein.

Figure 3:
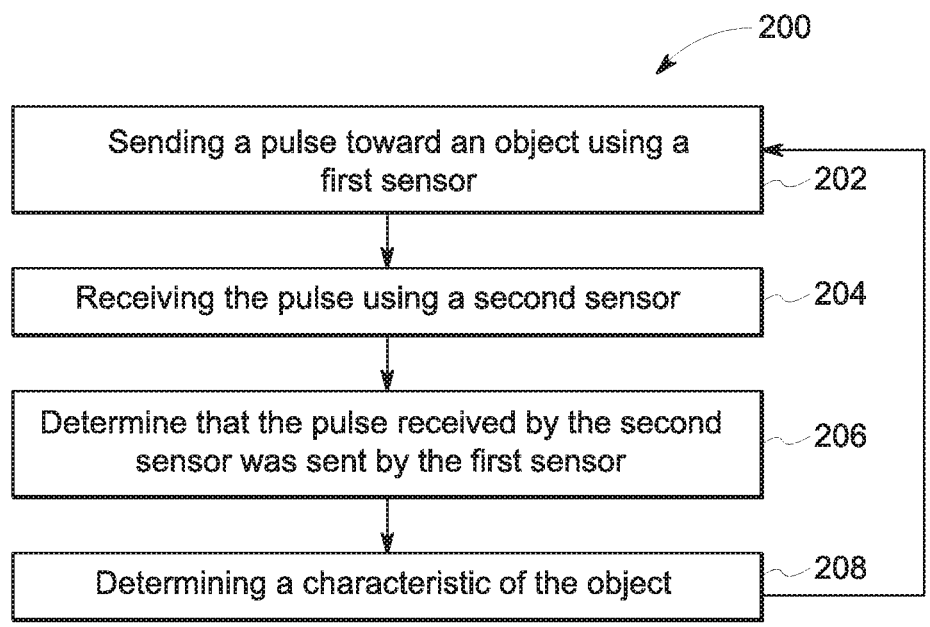
FIG. 3 is a flow diagram of an exemplary method of detecting characteristics of an object.

FIG. 3 is a flow diagram of an exemplary method 200 of detecting characteristics of an object such as pipe 104. In reference to FIGS. 1 and 3, method 200 generally includes sending 202 ultrasonic pulse 124 toward pipe 104 using first sensor 132, receiving 204 ultrasonic pulse 124 using second sensor 134, determining 206 that ultrasonic pulse 124 received by second sensor 134 was sent by first sensor 132, and determining 208, using controller 120, a characteristic of pipe 104 based on ultrasonic pulse 124. In some embodiments, method 200 includes sending a second ultrasonic pulse 124 toward pipe 104 using second sensor 134. In further embodiments, second ultrasonic pulse 124 is received by at least one of first sensor 132 and second sensor 134.

In some embodiments, determining 208 includes determining an estimated characteristic of an object based at least in part on information received from sensors 118. For example, in some embodiments, controller 120 estimates a location of pipe 104, a size of pipe 104, a type of material in BOP system 106, and any other characteristic of production system 100 and/or objects in production system 100. In further embodiments, method 200 includes comparing estimated characteristics determined by controller 120. For example, in some embodiments, controller 120 compares an estimated distance between sensors 118 and the target object to a distance determined based at least partially on the time-of-flight of ultrasonic pulses 124. In some embodiments, some potential or estimated distances are discarded based at least partially on criterion such as signal quality metrics, number of local peaks in the ultrasonic pulse, angles of reflection paths, locations of sensors 118, and any other parameters. In some embodiments, controller 120 goes through multiple iterations of determining estimated characteristics to determine a final estimated characteristic. For example, in some embodiments, controller 120 estimates a first set of parameters at a first time and a second set of parameters at a second time. Controller 120 then compares the first set of parameters and the second set of parameters. In some embodiments, controller 120 determines a third set of parameters. Such iterations are repeated until controller 120 determines a set of parameters within a suitable margin of error.

Also, in some embodiments, detection system 102 uses a probabilistic or geometric model to estimate distances. For example, in some embodiments, method 200 includes generating a probabilistic model by combining individual feasible parameters for each selected estimate, e.g., calculating the intersection of all feasible parameters. Selected potential or estimated distances are compared to the probabilistic model to determine a more accurate estimated distance. In some embodiments, the probabilistic model is based on factors such as the time of flight and distance traveled of ultrasonic pulse 124. For each distance estimate, the feasible reflection points form an ellipse. The most accurate estimate is determined along a circle that intersects the ellipse at the most points. In some embodiments, potential distances are processed by varying the target parameters to reduce the difference between the modeled distance and the estimated distance. In some embodiments, the difference between the modeled distance and the estimated distance is determined by algorithms including mean square errors, sums of absolute values, and any other suitable error metric. In alternative embodiments, controller 120 utilizes any probabilistic model that enables production system 100 to operate as described herein.

In further embodiments, sensors 118 are configured to vary a parameter of ultrasonic pulse 124 based at least partially on the estimated characteristic. For example, in some embodiments, sensors 118 vary at least one of a frequency, an amplitude, an emission time, a pulse duration, and an excitation code based on the estimated characteristic. As a result, detection system 102 is configured to more reliably determine characteristics of the object. For example, in some embodiments, detection system 102 determines a duration of ultrasonic pulse 124 based on an estimated distance to a target object. In further embodiments, detection system 102 determines an amplitude of ultrasonic pulse 124 based on a characteristic of production system 100. For example, in some embodiments, detection system 102 increases the amplitude of ultrasonic pulse 124 to facilitate ultrasonic pulse 124 traveling through a detected material along the path of ultrasonic pulse 124. In alternative embodiments, sensor 118 controls the parameters of ultrasonic pulses 124 based on any factor that enables the detection system 102 to operate as described herein.

In addition, in some embodiments, detection system 102 processes ultrasonic signals based at least partially on signal quality metrics such as signal to noise ratio. In further embodiments, detection system 102 determines parameters of ultrasonic pulses 124 based on the signal quality metrics. For example, in some embodiments, the length of the excitation code for ultrasonic pulses 124 is determined based on the number of echoes and the signal to noise ratio. In particular, a relatively high signal to noise ratio allows for shorter excitation codes which are simpler to identify. However, in some embodiments, sensors 118 utilize longer excitation codes to allow processing of the excitation codes if the signal to noise ratio is lower. In alternative embodiments, detection system 102 utilizes any signal quality metrics that enable detection system 102 to operate as described herein.

The above-described methods and systems provide reliable detection of an object in difficult to access locations. For example, embodiments of a detection system include a plurality of sensors that send pulses towards an object. At least one sensor of the plurality of sensors is configured to receive a pulse sent by a different sensor and the detection system is configured to determine the source of the pulse. In addition, in some embodiments, the sensors are configured to emit pulses at the same time. As a result, the detection system more reliably determines characteristics of the object in comparison to systems where each sensor sends and receives the same ultrasonic pulse and sensors only emit pulses in a sequential order. Moreover, in some embodiments, parameters of the ultrasonic pulses are varied to facilitate detection of the object. For example, in some embodiments, the parameters are varied based on an estimated characteristic of the object.

An exemplary technical effect of the methods, systems, and apparatus described herein includes at least one of: (a) providing a position of a pipe joint relative to BOP systems; (b) increasing reliability of BOP systems; (c) providing data relating to real-time geometry of a wellbore during operation; (d) providing a detection system that is compatible with different production systems; (e) providing a detection system for retrofitting to production systems; (f) increasing safety and efficiency of production systems; (g) increasing the rate of updates for target estimates for a detection system; and (h) providing a detection system for use across a range of target movement rates.

Some embodiments involve the use of one or more electronic or computing devices. Such devices typically include a processor or controller, such as a general purpose central processing unit (CPU), a graphics processing unit (GPU), a microcontroller, a field programmable gate array (FPGA), a reduced instruction set computer (RISC) processor, an application specific integrated circuit (ASIC), a programmable logic circuit (PLC), and/or any other circuit or processor capable of executing the functions described herein. In some embodiments, the methods described herein are encoded as executable instructions embodied in a computer readable medium, including, without limitation, a storage device, and/or a memory device. Such instructions, when executed by a processor, cause the processor to perform at least a portion of the methods described herein. The above examples are exemplary only, and thus are not intended to limit in any way the definition and/or meaning of the term processor.

Exemplary embodiments of detection methods, systems, and apparatus are not limited to the specific embodiments described herein, but rather, components of systems and/or steps of the methods may be utilized independently and separately from other components and/or steps described herein. For example, the methods may also be used in combination with other systems requiring detection systems, and are not limited to practice with only the systems and methods as described herein. Rather, the exemplary embodiment can be implemented and utilized in connection with many other applications, equipment, and systems that may benefit from improved detection of an object.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A detection system comprising:
a first sensor configured to send a first ultrasonic pulse toward an object in a blowout prevention system, wherein the first ultrasonic pulse has a first parameter;
a second sensor spaced from said first sensor and configured to send a second ultrasonic pulse toward the object, wherein the second sensor transmits the second ultrasonic pulse at the same time as the first sensor transmits the first ultrasonic pulse, the second ultrasonic pulse having a second parameter that is different from the first parameter of the first ultrasonic pulse, wherein the first parameter and the second parameter are one of an amplitude, a frequency, a duration, an emission time, and an excitation code, and wherein said second sensor is further configured to receive the first ultrasonic pulse after the first ultrasonic pulse interacts with the object, and wherein said detection system is configured to determine that the first ultrasonic pulse received by said second sensor was sent by said first sensor based on the first parameter, wherein the second sensor is spaced from the first sensor by less than 180° about the circumference of the object; and a controller coupled to said second sensor and configured to determine a characteristic of the object based on the first ultrasonic pulse, wherein said controller is configured to process the first ultrasonic pulse received by the second sensor and determine at least one signal quality metric for the first ultrasonic pulse, wherein said first sensor is configured to send a third ultrasonic pulse, and wherein said controller is configured to vary an excitation code of the third ultrasonic pulse based on the at least one signal quality metric.

2. The detection system in accordance with claim 1, wherein at least one of said first sensor and said second sensor is configured to receive the second ultrasonic pulse and determine that the second ultrasonic pulse was sent by said second sensor.

3. The detection system in accordance with claim 1, wherein said first sensor comprises a first ultrasonic transducer configured to generate the first ultrasonic pulse, and wherein said second sensor comprises a second ultrasonic transducer configured to generate the second ultrasonic pulse.

4. The detection system in accordance with claim 1, wherein said controller is further configured to estimate a first set of parameters at a first time, estimate a second set of parameters at a second time, and compare the first set of parameters and the second set of parameters.

5. The detection system in accordance with claim 1, wherein said controller is further configured to determine an estimated characteristic, wherein said first sensor is configured to vary a parameter of the first ultrasonic pulse based on the estimated characteristic of the object.

6. The detection system in accordance with claim 1, wherein the object is a tool extending through the blowout prevention system and a wellbore, and wherein to determine a characteristic of the object, said controller is configured to determine at least one of a size and a location of the tool based on the first ultrasonic pulse.

7. A method of detecting an object in a blowout prevention system, said method comprising:
sending, using a first sensor, a first ultrasonic pulse toward an object;
receiving, using a second sensor, the first ultrasonic pulse after the first ultrasonic pulse interacts with the object, wherein the second sensor is spaced from the first sensor by less than 180° about the circumference of the object, and wherein the second sensor is configured to transmit a second ultrasonic pulse at the same time as the first sensor transmits the first ultrasonic pulse;
determining that the first ultrasonic pulse received by the second sensor was sent by the first sensor;
determining, using a controller coupled to the second sensor, a characteristic of the object based on the first ultrasonic pulse;
determining at least one signal quality metric for the first ultrasonic pulse;
sending, using the first sensor, a third ultrasonic pulse toward the object; and
varying an excitation code of the third ultrasonic pulse based on the at least one signal quality metric.

8. The method in accordance with claim 7 further comprising determining an estimated characteristic and varying a parameter of the first ultrasonic pulse based on the estimated characteristic of the object.

9. The method in accordance with claim 7, wherein the object is a pipe extending through the blowout prevention system and a wellbore, said method further comprising generating a geometric model of at least one location of the pipe.

10. The method in accordance with claim 7 further comprising determining an estimated characteristic of the object, and determining a parameter of the first ultrasonic pulse based on the estimated characteristic of the object, the parameter including one of an amplitude, a frequency, a duration, an emission time, and an excitation code.

11. The method in accordance with claim 7, wherein determining a characteristic of the object comprises determining at least one of a location of the object and a size of the object.

12. The method in accordance with claim 7 further comprising sending, using the second sensor, a second ultrasonic pulse toward the object.

13. The method in accordance with claim 12 further comprising receiving, using a third sensor, the first ultrasonic pulse.

14. The method in accordance with claim 12 further comprising receiving the second ultrasonic pulse using at least one of the first sensor and the second sensor.

15. The method in accordance with claim 12 wherein sending the second ultrasonic pulse toward the object comprises sending a second ultrasonic pulse having a second parameter that is different from a first parameter of the first ultrasonic pulse, wherein the first parameter and the second parameter are one of an amplitude, a frequency, a duration, an emission time, and an excitation code.

16. The method in accordance with claim 15, wherein determining that the first ultrasonic pulse was sent by the first sensor comprises determining that the first ultrasonic pulse was sent by the first sensor based on the first parameter.

17. A production system comprising:
a pipe extending through a wellbore;
a blowout preventer configured to receive said pipe; and
a detection system configured to detect said pipe, said detection system comprising:
a first sensor configured to send a first ultrasonic pulse toward said pipe;
a second sensor spaced from said first sensor by less than 180° about the circumference of said pipe, said second sensor configured to transmit a second ultrasonic pulse at the same time as the first sensor transmits the first ultrasonic pulse, wherein said second sensor is configured to receive the first ultrasonic pulse after the first ultrasonic pulse interacts with said pipe, wherein said detection system is further configured to determine that the first ultrasonic pulse received by said second sensor was sent by said first sensor; and
a controller coupled to said second sensor and configured to determine a characteristic of said pipe based on the first ultrasonic pulse, wherein said controller is configured to process the first ultrasonic pulse received by the second sensor and determine at least one signal quality metric for the first ultrasonic pulse, wherein said first sensor is configured to send a third ultrasonic pulse, and wherein said controller is configured to vary an excitation code of the third ultrasonic pulse based on the at least one signal quality metric.

18. The production system in accordance with claim 17, wherein said detection system is configured to determine that the first ultrasonic pulse was sent by said first sensor based on at least one of an amplitude, a frequency, a duration, an emission time, and an excitation code of the first ultrasonic pulse.

19. The production system in accordance with claim 17, wherein said first sensor is configured to vary a parameter of the first ultrasonic pulse based on an estimated characteristic of said pipe.

* * * * *